United States Patent
Carvalho et al.

(10) Patent No.: US 10,235,163 B2
(45) Date of Patent: Mar. 19, 2019

(54) COORDINATING SOFTWARE BUILDS FOR DIFFERENT COMPUTER ARCHITECTURES

(71) Applicant: Red Hat, Inc., Raleigh, NC (US)

(72) Inventors: Luiz Carvalho, Haverhill, MA (US); Noah Harrison Ripps, Groton, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 15/625,120

(22) Filed: Jun. 16, 2017

(65) Prior Publication Data
US 2018/0365006 A1   Dec. 20, 2018

(51) Int. Cl.
| | | |
|---|---|---|
| G06F 9/44 | (2018.01) | |
| G06F 8/71 | (2018.01) | |
| G06F 8/61 | (2018.01) | |
| G06F 8/20 | (2018.01) | |
| G06F 8/70 | (2018.01) | |
| H04L 29/08 | (2006.01) | |

(52) U.S. Cl.
CPC ............ *G06F 8/71* (2013.01); *G06F 8/61* (2013.01); *G06F 8/22* (2013.01); *G06F 8/70* (2013.01); *H04L 67/10* (2013.01)

(58) Field of Classification Search
CPC ...................................................... G06F 8/71
USPC .................. 717/120–124, 108–109, 116
See application file for complete search history.

(56) References Cited

U.S. PATENT DOCUMENTS

| | | | | |
|---|---|---|---|---|
| 7,051,180 B2* | 5/2006 | Downer | ............... | G06F 9/5061 709/215 |
| 7,168,064 B2* | 1/2007 | Ousterhout | ............... | G06F 8/41 714/E11.2 |
| 7,493,592 B2* | 2/2009 | Karatal | ............... | G06F 9/451 717/105 |
| 7,533,365 B1* | 5/2009 | Hogstrom | ............... | G06F 8/10 717/104 |
| 7,537,976 B2* | 5/2009 | Hirose | ............... | H01L 29/41733 257/E21.166 |
| 7,676,788 B1* | 3/2010 | Ousterhout | ............... | G06F 8/71 709/226 |
| 7,698,398 B1* | 4/2010 | Lai | ............... | G06F 8/10 709/223 |

(Continued)

FOREIGN PATENT DOCUMENTS

WO   WO 2016/053306 A1   4/2016

OTHER PUBLICATIONS

Kaur et al, "A Layered Structure for Uniform Version Management in Component Based Systems", ACM SIGSOFT Software Engineering Notes, vol. 34, No. 6, pp. 1-7, 2009.*

(Continued)

*Primary Examiner* — Anil Khatri
(74) *Attorney, Agent, or Firm* — Kilpatrick Townsend & Stockton LLP

(57) ABSTRACT

Software can be built for different computer architectures. For example, an orchestration node in an orchestration cluster of nodes can receive a request from a client device to build the software. In response to receiving the request, the orchestration node can transmit a first request to a first cluster of nodes to cause the first cluster of nodes to build a first version of the software that is compatible with a first computer architecture. The orchestration node can additionally or alternatively transmit a second request to a second cluster of nodes to cause the second cluster of nodes to build a second version of the software that is compatible with a second computer architecture. The second computer architecture can be different from the first computer architecture.

20 Claims, 3 Drawing Sheets

(56) References Cited

U.S. PATENT DOCUMENTS

| | | | | |
|---|---|---|---|---|
| 8,533,661 | B2* | 9/2013 | Nucci | G06F 8/10 |
| | | | | 717/105 |
| 8,572,679 | B1* | 10/2013 | Wang | G06F 8/65 |
| | | | | 370/328 |
| 8,850,432 | B2 | 9/2014 | McGrath et al. | |
| 9,134,962 | B1* | 9/2015 | Stephens | G06F 8/20 |
| 9,286,043 | B2* | 3/2016 | Jubran | G06F 8/443 |
| 9,594,546 | B1 | 3/2017 | Todd et al. | |
| 9,635,088 | B2 | 4/2017 | Sharma et al. | |
| 9,760,349 | B1* | 9/2017 | Chen | G06F 8/433 |
| 9,916,133 | B2* | 3/2018 | Jubran | G06F 8/00 |
| 2015/0242197 | A1 | 8/2015 | Alfonso et al. | |
| 2017/0024392 | A1 | 1/2017 | Shah et al. | |

OTHER PUBLICATIONS

Kim et al, "Program Element Matching for Multi-Version Program Analyses", ACM, pp. 58-64, 2006.*

Srinivas et al, "Clustering Software Project Components for Strategic Decisions and Building Reuse Libraries", ACM, pp. 1-5, 2015 (Year: 2015).*

Hassan et al, "Change-Aware Build Prediction Model for Stall Avoidance in Continuous Integration", IEEE, pp. 157-162, 2017 (Year: 2017).*

D'Ambrogio', "A Model Transformation Framework for the Automated Building of Performance Models from UML Models", ACM, pp. 75-86, 2005 (Year: 2005).*

Font et al, "Building Software Product Lines from Conceptualized Model Patterns", ACM, pp. 46-55, 2015 (Year: 2015).*

Carvalho, L., "OSBS Documentation," Mar. 2, 2017 https://media.readthedocs.org/pdf/osbs/latest/osbs.pdf.

Qiang, W., et al., "CDMCR: Multi-Level Fault-Tolerant System for Distributed Applications in Cloud," Jan. 28, 2015 http://onlinelibrary.wiley.com/dci/10.1002/sec.1187/full.

"Testing Openshift Origin V3 with Ansible and Vagrant on OS X," Jun. 28, 2015, http://guifreelife.com/blog/2015/06/28/Testing-Openshift-Origin-V3-with-Ansible-and-Vagrant-on-OS-X.

* cited by examiner

COORDINATING SOFTWARE BUILDS FOR DIFFERENT COMPUTER ARCHITECTURES

TECHNICAL FIELD

The present disclosure relates generally to providing versatility for different computer architectures. More specifically, but not by way of limitation, this disclosure relates to coordinating software builds for different computer architectures.

BACKGROUND

A client device can request that a cluster of nodes build software. For example, the client device can request that the cluster of nodes build a container image (e.g., a Docker™ image) that can deploy a container. In response to the request, the cluster of nodes can build the software, which can then be accessed or otherwise used by the client device.

DETAILED DESCRIPTION

Figure 1:
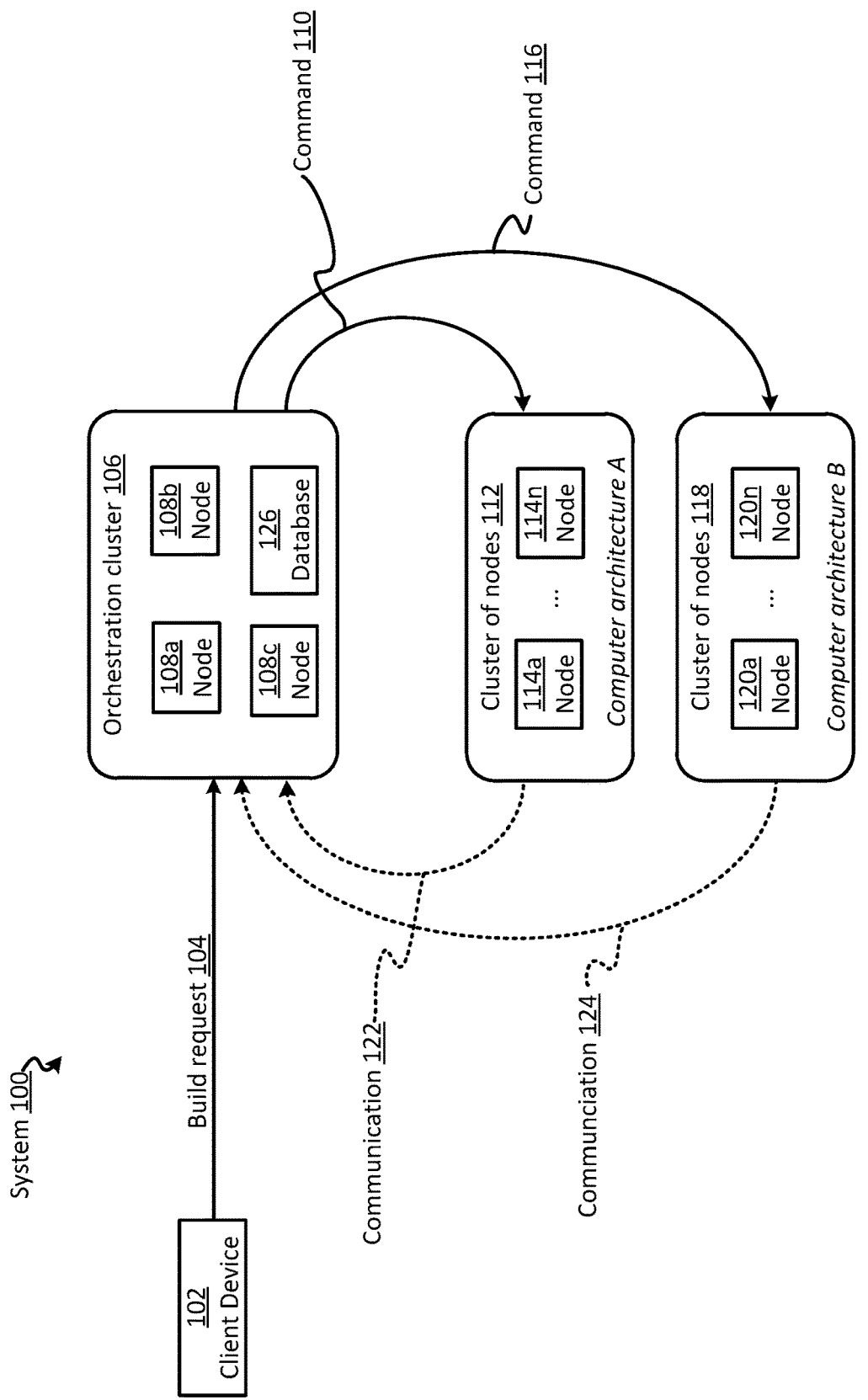
FIG. 1 is a block diagram of an example of a system for coordinating software builds for different computer architectures according to some aspects.

A cluster of nodes may only be able to build software for a specific type of computer architecture (e.g., a set or rules that describe the functionality, organization, implementation, or any combination of these, for a computer). For example, the cluster of nodes may be running on computers having the x86 computer architecture, which can have a specific instruction-set design, microarchitecture design, logic design, implementation, or any combination of these. This may result in the cluster of nodes only being able to build a version of the software that is compatible with other computers having the x86 computer architecture. But there can be disadvantages to a cluster of nodes only being able to build software for a specific type of computer architecture, such as the x86 computer architecture. For example, this can prevent computers having other types of computer architectures, such as the 64-bit or 32-bit version of the PowerPC architecture, from using the software.

Some examples of the present disclosure can overcome one or more of the abovementioned issues by using multiple clusters of nodes to build multiple versions of software that are compatible with a variety of computer architectures. For example, a client device can transmit a request to build software, or a build request, to an orchestration cluster of nodes. The orchestration cluster of nodes is a group of nodes that can receive the build request and orchestrate (e.g., coordinate) the building of multiple versions of software among multiple clusters of nodes in response to the build-request. For example, the orchestration cluster of nodes can identify multiple clusters of nodes having different computer architectures for use in building the software. The orchestration cluster of nodes can then transmit build requests to the multiple clusters of nodes to cause the multiple versions of the software to be built. Each cluster of nodes can build a respective version of the software that is compatible with a specific type of computer architecture. Examples of computer architectures can include x86; the Motorola™ 6800 and 68000 architectures; the Power architectures, such as the 64-bit PowerPC architecture and the 32-bit PowerPC architecture; the MOS Technology™ 6502 architecture; the ARM architecture, such as the 64-bit or 32-bit ARM architectures; and the Renesas™ FAX CPU architecture. The multiple clusters of nodes can then transmit the built versions of the software back to the orchestration cluster of nodes or otherwise make the built versions of the software available to the client device (or other client devices). This may enable client devices having various types of computer architectures to use the software.

In some examples, the orchestration cluster of nodes can act as a single point of communication for the client device. This can enable the client device to quickly and easily cause multiple versions of software to be built for a variety of computer architectures by issuing a single build-request to a single point of communication.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for coordinating software builds for different computer architectures according to some aspects. The system 100 includes a client device 102 in communication with an orchestration cluster 106. The client device 102 can transmit a build request 104 to the orchestration cluster 106 for causing software to be built. In response to the build request 104, the orchestration cluster 106 can transmit a command 110 to a cluster of nodes 112 having one type of computer architecture (e.g., computer architecture A) and another command 116 to another cluster of nodes 118 having another type of computer architecture (e.g., computer architecture B). In response to the commands 110, 116, the clusters of nodes 112, 118 can build respective versions of the software that are compatible with their respective computer architectures. The clusters of nodes 112, 118 can then transmit the built versions of the software or other communications 122, 124 back to the orchestration cluster 106, the client device 102, or both.

In some examples, the client device 102 can be a laptop computer, desktop computer, or other computing device capable of transmitting the build request 104 to the orchestration cluster 106 for causing software to be built. The software can be any type of software, such as system software, a software application, a utility application, an operating system, a game, or any combination of these. In some examples, the build request 104 is submitted to the orchestration cluster 106 by a package-management program, such as Koji™ or Brew™, executing on the client device 102.

The orchestration cluster 106 can be a single point of communication to which the client device 102 can transmit the build request 104. The orchestration cluster 106 can include any number and combination of nodes, such as nodes 108a-c, executing any number and combination of software, such as OpenShift™. Examples of the nodes can include computing devices, servers, virtual machines, or any combination of these. The nodes of the orchestration cluster 106 can individually or collectively coordinate the software build(s) among one or more other clusters of nodes 112, 118. For example, the nodes in the orchestration cluster 10 can receive the build request 104 and determine one or more other clusters of nodes 112, 118 to operate to implement the build request 104.

The orchestration cluster 106 can determine other clusters of nodes 112, 118 to operate to implement the build request 104 based on the computer architectures of the other clusters of nodes 112, 118. For example, the build request 104 from the client device 102 may specify a particular computer architecture for which the software is to be built. Or the client device 102 may select one or more computer architectures for which the software is to be built. Or a configuration the for the software may specify one or more computer architectures for which the software is to be built. In any of these cases, the orchestration cluster 106 can use the provided information to determine for which computer architectures the software is to be built. The orchestration cluster 106 can then determine which clusters of nodes 112, 118 have the computer architectures for which the software is to be built. For example, the orchestration cluster 106 can determine that the software is to be built on for an ×86 computer architecture and a 64-bit PowerPC computer architecture. The orchestration cluster 106 can then access a database 126 to determine which clusters of nodes have the ×86 computer architecture and the 64-bit PowerPC computer architecture. The database 126 can be internal or external to the orchestration cluster 106, and can relate the clusters of nodes to their associated computer architectures. The orchestration cluster 106 can use the database 126 to determine that, for example, the cluster of nodes 112 has the ×86 computer architecture and cluster of nodes 118 has the 64-bit PowerPC architecture. Based on the clusters of nodes 112, 118 having the appropriate computer architectures, the orchestration cluster 106 can select the clusters of nodes 112, 118 for use in building the software.

In some examples, the orchestration cluster 106 can select among multiple clusters of nodes having the same computer architecture based on the availability of the multiple clusters of nodes. For example, the orchestration cluster 106 may determine (e.g., using database 126) that both the cluster of nodes 112 and another cluster of nodes have the same computer architecture, such as the ×86 computer architecture. To determine which of the two clusters of nodes to use to build the software for the ×86 computer architecture, the orchestration cluster 106 can communicate with the clusters of nodes to determine their availability. If one of the clusters of nodes is busy performing another job (e.g., another build), then the orchestration cluster 106 can select the other cluster of nodes for use in building the software. If all of the clusters of nodes are available to build the software, then the orchestration cluster 106 can randomly select between the clusters of nodes. In some examples, the orchestration cluster 106 can select between the clusters of nodes using one or more additional or alternative criteria. For example, the orchestration cluster 106 can select between the clusters of nodes based on (i) the amount of processing power or memory allocated to the clusters of nodes; (ii) the financial costs of using the clusters of nodes; (iii) the amount of time the clusters of nodes will take to build the software; or (iv) any combination of these.

After selecting the appropriate clusters of nodes 112, 118 to use to build the software, the orchestration cluster 106 can transmit commands 110, 116 to the clusters of nodes 112, 118. The commands 110, 116 can include build requests. The orchestration cluster 106 can transmit any number and combination of commands to any number and combination of clusters of nodes for causing any number and combination of versions of the software to be built for any number and combination of computer architectures.

In some examples, the cluster of nodes 112 can receive the command 110 and, in response to the command 110, build a version of the software that is compatible with (e.g., executable by) computer architecture A. Building the software can include (i) compiling source code for the software into object code; (ii) converting program code for the software into another format; (iii) combining multiple files related to the software into an archived file, such as an image file, zip file, or tarball file; or (iv) any combination of these. In some examples, building the software includes obtaining one or more files from a code repository, such as a GIT™ repository, related to the software and generating a container image using some or all of the files from the code repository. The container image can be a file type usable to launch a container within a host environment.

The cluster of nodes 112 can include any number and combination of nodes, such as nodes 114a-n, for building the version of the software that is compatible with computer architecture A. In some examples, every node in the cluster of nodes 112 has computer architecture A. Alternatively, some of the nodes in the cluster of nodes 112 may have computer architecture A and other nodes in the cluster of nodes 112 may have another type of computer architecture, such as computer architecture C. In some examples, the version of the software built for computer architecture A may not be compatible with another type of computer architecture, such as computer architecture B, and vice-versa. For example, the version of the software that is built for the ×86 computer architecture may not be compatible with the 64-bit PowerPC computer architecture, and vice-versa.

Additionally or alternatively, the cluster of nodes 118 can receive the command 116 and, in response to the command 116, build a version of the software that is compatible with computer architecture B. The cluster of nodes 118 can include any number and combination of nodes, such as nodes 120a-n, for building the version of the software that is compatible with computer architecture B. In some examples, every node in the cluster of nodes 118 has computer architecture B. Alternatively, some of the nodes in the cluster of nodes 118 may have computer architecture B and other nodes in the cluster of nodes 118 may have another type of computer architecture, such as computer architecture C. In some examples, the version of the software built for computer architecture B may not be compatible with another type of computer architecture, such as computer architecture A.

In some examples, the orchestration cluster 106 and the clusters of nodes 112, 118 can communicate with each other before, during, or after building their respective versions of the software. For example, the clusters of nodes 112, 118 can transmit communications 122, 124 to the orchestration cluster 106. Examples of the communications 122, 124 can include responses to, or acknowledgements of, the commands 110, 116. In some examples, the orchestration cluster 106 can monitor the software builds being performed by the clusters of nodes 112, 118 and take any corrective action, if necessary. For example, if a build on the cluster of nodes 112 fails or is otherwise unable to be performed, the orchestration cluster 106 can attempt to re-initiate the build on the cluster of nodes 112 or select an alternative cluster of nodes to build the software. In some examples, the clusters of nodes 112, 118 can transmit log files, results from, or other information related to their respective builds to the orchestration cluster 106.

As a particular example, the clusters of nodes 112, 118 can build container images configured for computer architecture A and computer architecture B, respectively. The clusters of nodes 112, 118 can also create image manifests having metadata related to the container images. For example, the cluster of nodes 112 can create an image manifest related to a container image, where the image manifest includes a configuration for the container image, a set of layers for the container image, an indication of which computer architecture was used to build the container image, or any combination of these. The clusters of nodes 112, 118 can then transmit the container images, image manifests, or any combination of these to the orchestration cluster 106. The orchestration cluster 106 can then make some or all of this information available to the client device 102 or other client devices. In some examples, the orchestration cluster 106 can combine the image manifests from the multiple clusters of nodes into a manifest list. For example, the orchestration cluster 106 can combine an image manifest from the cluster of nodes 112 and another image manifest from the cluster of nodes 118 to generate a manifest list. The manifest list can indicate which image manifests correspond to which computer architectures. The client device 102 can use the manifest list to determine which version of the container image is compatible with the client device 102 and select that version of the container image to download.

Although FIG. 1 shows one orchestration cluster 106 and two other clusters of nodes 112, 118, the system 100 can include any number and combination of clusters of nodes having any number and combination of computer architectures, platforms, operating systems, or any combination of these. And the clusters of nodes can be geographically distributed from one another in any suitable arrangement. For example, the orchestration cluster 106 can be a cloud-based group of nodes provided by Amazon™ Web Services. And the other clusters of nodes 112, 118 can be geographically remote from the orchestration cluster 106, from each other, or both. Further, the clusters of nodes can be in communication with each other via any number and combination of networks, such as the Internet, local area networks (LANs), or wide area networks (WANs).

Figure 2:
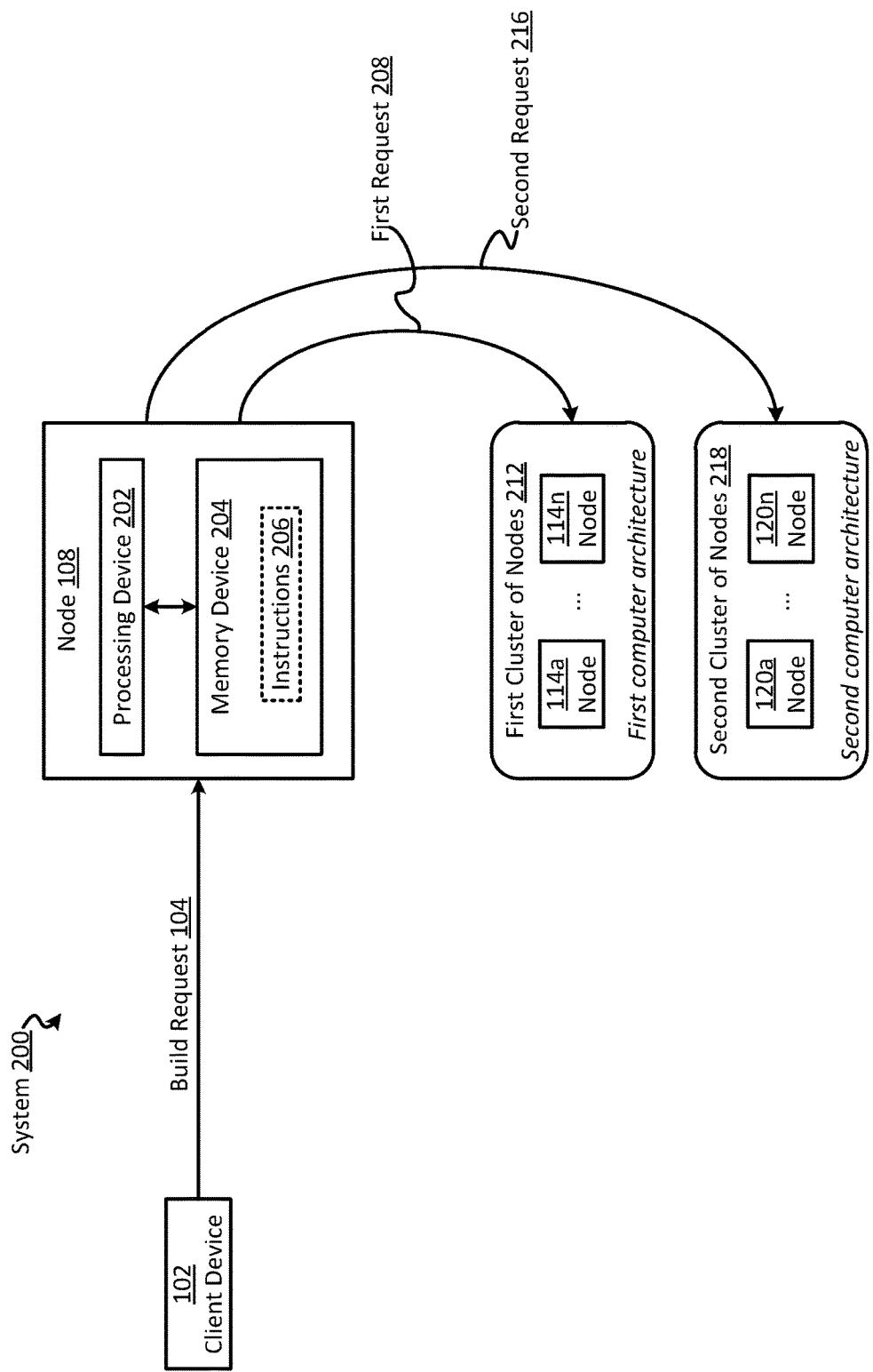
FIG. 2 is a block diagram of another example of a system for coordinating software builds for different computer architectures according to some aspects.

FIG. 2 is a block diagram of another example of a system 200 for coordinating software builds for different computer architectures according to some aspects. The system 200 includes the client device 102 in communication with a node 108, which can be a node in an orchestration cluster. The node 108 may be referred to as an orchestration node. The client device 102 can transmit a build request 104 to the node 108, which in turn can transmit a first request to a first cluster of nodes 212 and a second request 216 to a second cluster of nodes 218. The first request 208 and second request 216 can be build requests or other commands. The first cluster of nodes 212 can have a first computer architecture and the second cluster of nodes 218 can have a second computer architecture that is different from the first computer architecture. For example, the first cluster of nodes 212 can have the 32-bit PowerPC computer architecture and the second cluster of nodes 218 can have the 64-bit PowerPC architecture. The first cluster of nodes 212 can receive the first request 208 and build a first version of the software that is compatible with the first computer architecture. The second cluster of nodes 218 can receive the second request 216 and build a second version of the software that is compatible with the second computer architecture. In some examples, the first version of the software is incompatible with the second computer architecture, and the second version of the software is incompatible with the first computer architecture.

The node 108 can include any number and combination of hardware and software components. In the example shown in FIG. 1, the node 108 includes a processing device 202 communicatively coupled to a memory device 204. The processing device 202 can include one processing device or multiple processing devices. Non-limiting examples of the processing device 202 include a Field-Programmable Gate Array (FPGA), an application-specific integrated circuit (ASIC), a microprocessor, etc.

The processing device 202 can execute one or more operations for coordinating software builds for different computer architectures. The processing device 202 can execute instructions 206 stored in the memory device 204 to perform the operations. In some examples, the instructions can include processor-specific instructions generated by a compiler or an interpreter from code written in any suitable computer-programming language, such as C, C++, C#, etc.

Memory device 204 can include one memory device or multiple memory devices. The memory device 204 can be non-volatile and may include any type of memory device that retains stored information when powered off. Non-limiting examples of the memory device 204 include electrically erasable and programmable read-only memory (EEPROM), flash memory, or any other type of non-volatile memory. In some examples, at least some of the memory device can include a medium from which the processing device 202 can read instructions 206. A computer-readable medium can include electronic, optical, magnetic, or other storage devices capable of providing the processing device with computer-readable instructions 206 or other program code. Non-limiting examples of a computer-readable medium include magnetic disk(s), memory chip(s), ROM, random-access memory (RAM), an ASIC, a configured processor, optical storage, or any other medium from which a computer processor can read instructions 206.

Figure 3:
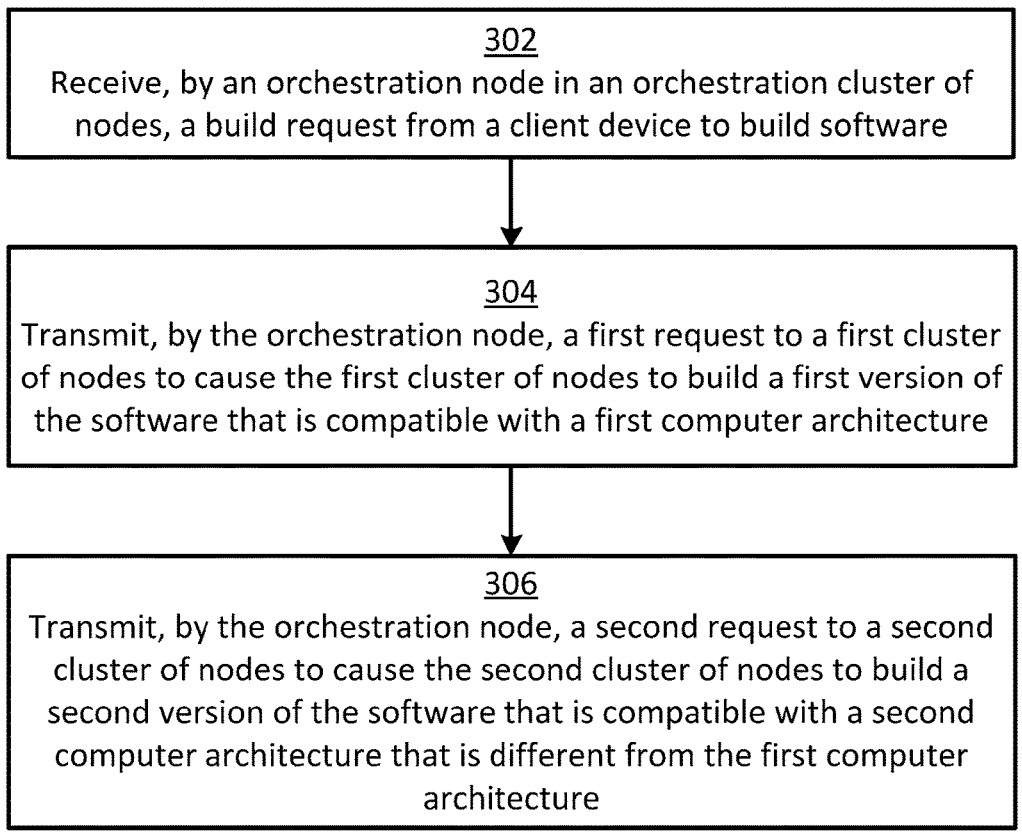
FIG. 3 is a flow chart of an example of a process for coordinating software builds for different computer architectures according to some aspects.

In some examples, the node 108 or a combination of nodes can implement some or all of the steps shown in FIG. 3 to build software for different computer architectures. In other examples, the node 108 or a combination of nodes can implement more steps, fewer steps, different steps, or a different order of the steps depicted in FIG. 3. The steps of FIG. 3 are described with reference to components discussed above.

In block 302, an orchestration node in an orchestration cluster 106 receives a build request 104 from a client device 102 to build software. For example, the orchestration node can receive the build request 104 from the client device 102 over the Internet, a LAN, or a WAN. The build request 104 can have any suitable format that is understandable by the orchestration node.

In block 304, the orchestration node transmits a first request 208 to a first cluster of nodes 212 to cause the first cluster of nodes 212 to build a first version of the software that is compatible with a first computer architecture. The first request 208 can include one or more commands for causing the first cluster of nodes 212 to build the first version of the software.

The first cluster of nodes 212 can receive the first request 208 and build the first version of the software in response to the first request 208. In some examples, the first cluster of nodes 212 builds the first version of the software by fetching content from a code repository; performing the build (e.g., performing a Docker™ build) to create a container image;

tagging the container image with metadata indicating the computer architecture on which the container image was built, uploading or publishing the container image; uploading a tarball or other archive file associated with the container image to a package-management program, such as Koji™; or any combination of these.

In block 306, the orchestration node transmits a second request 216 to a second cluster of nodes 218 to cause the second cluster of nodes 218 to build a second version of the software that is compatible with a second computer architecture, which may or may not be different from the first computer architecture. The second request 216 can include one or more commands for causing the second cluster of nodes 218 to build the second version of the software. The second cluster of nodes 218 can receive the second request 216 and build the second version of the software in response to the second request 216. The second cluster of nodes 218 may build the second version of the software using one or more of the steps discussed above.

Figure 4:
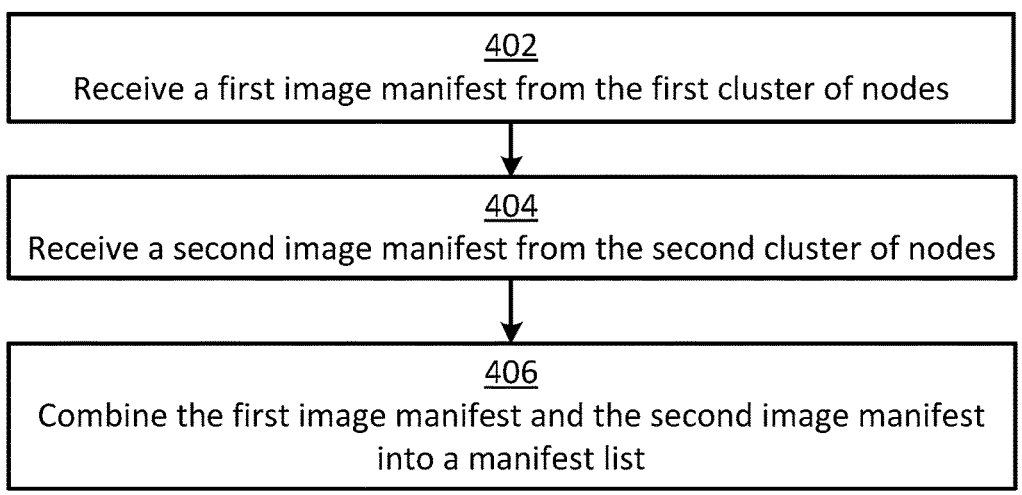
FIG. 4 is a flow chart of an example of a process for generating a manifest list according to some aspects.

In some examples, the first cluster of nodes 212 and the second cluster of nodes 218 can communicate information back to the orchestration cluster 106 while performing the build or after completing the build. The orchestration cluster 106 can implement one or more processes based on this information. One example of such a process is shown in FIG. 4. In other examples, the orchestration cluster 106 can implement more steps, fewer steps, different steps, or a different order of the steps depicted in FIG. 4. The steps of FIG. 4 are described with reference to components discussed above.

In block 402, the orchestration cluster 106 receives a first image manifest from the first cluster of nodes 212. The first image manifest can be related to a first image file that is compatible with or configured for a first type of computer architecture.

In block 404, the orchestration cluster 106 receives a second image manifest from the second cluster of nodes 218. The second image manifest can be related to a second image file that is compatible with or configured for a second type of computer architecture.

In block 406, the orchestration cluster 106 combines the first image manifest and the second image manifest into a manifest list. The manifest list can indicate that the first image file is compatible with the first type of computer architecture and the second image file is compatible with the second type of computer architecture.

In some examples, the orchestration cluster 106 can additionally or alternatively upload, publish, or update the first image file, the second image file, the manifest list, or any combination of these. For example, the orchestration cluster 106 can update (e.g., using repository-management software commonly referred to as Pulp) a repository of image files related to the software to include the first image file, the second image file, and the manifest list.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A node comprising:
a processing device; and
a memory device including instructions executable by the processing device for causing the processing device to:
receive a build request from a client device to build software; and
in response to receiving the build request:
transmit a first request to a first cluster of nodes to cause the first cluster of nodes to build a first version of the software that is compatible with a first computer architecture, wherein at least one node in the first cluster of nodes has the first computer architecture; and
transmit a second request to a second cluster of nodes to cause the second cluster of nodes to build a second version of the software that is compatible with a second computer architecture that is different from the first computer architecture, wherein at least one node in the second cluster of nodes has the second computer architecture.

2. The node of claim 1, wherein the node is part of an orchestration cluster of nodes that is positioned geographically remote from the first cluster of nodes.

3. The node of claim 1, wherein:
each node in the first cluster of nodes has the first computer architecture; and
each node in the second cluster of nodes has the second computer architecture.

4. The node of claim 1, wherein the first computer architecture is a 64-bit version of an x86 architecture, a 64-bit version of a PowerPC architecture, or a 32-bit version of the PowerPC architecture.

5. The node of claim 1, wherein the first version of the software is a first image file that is configured for the first computer architecture, the second version of the software is a second image file that is configured for the second computer architecture, and the memory device further comprises instructions executable by the processing device for causing the processing device to:
receive a first image manifest having metadata for the first image file from the first cluster of nodes;
receive a second image manifest having metadata for the second image file from the second cluster of nodes; and
combine the first image manifest and the second image manifest into a manifest list.

6. The node of claim 5, wherein:
the build request is a request to build a container image from source code for the software, the container image being configured for launching a container within a host environment;
first image file is a first container image that is compatible with the first computer architecture; and
the second image file is a second container image that is compatible with the second computer architecture.

7. A method comprising:
receiving, by an orchestration node in an orchestration cluster of nodes, a build request from a client device to build software; and
in response to receiving the build request:
transmitting, by the orchestration node, a first request to a first cluster of nodes to cause the first cluster of nodes to build a first version of the software that is compatible with a first computer architecture, wherein at least one node in the first cluster of nodes has the first computer architecture; and
transmitting, by the orchestration node, a second request to a second cluster of nodes to cause the second cluster of nodes to build a second version of the software that is compatible with a second computer architecture that is different from the first computer architecture, wherein at least one node in the second cluster of nodes has the second computer architecture.

8. The method of claim 7, wherein:
each node in the first cluster of nodes has the first computer architecture;
each node in the second cluster of nodes has the second computer architecture;
the first version of the software is not compatible with the second computer architecture; and
the second version of the software is not compatible with the first computer architecture.

9. The method of claim 7, wherein the first computer architecture is a 64-bit version of an ×86 architecture, a 64-bit version of a PowerPC architecture, or a 32-bit version of the PowerPC architecture.

10. The method of claim 9, wherein the second computer architecture is the 64-bit version of the ×86 architecture, the 64-bit version of the PowerPC architecture, or the 32-bit version of the PowerPC architecture.

11. The method of claim 7, further comprising determining that the first request is to be transmitted to the first cluster of nodes and the second request is to be transmitted to the second cluster of nodes by (i) extracting information, from a configuration file, indicating on which computer architectures the software is to be built, or (ii) receiving a selection of the first computer architecture and the second computer architecture from the client device.

12. The method of claim 7, wherein the first version of the software is a first image file that is configured for the first computer architecture, the second version of the software is a second image file that is configured for the second computer architecture, and further comprising:
receiving a first image manifest having metadata for the first image file from the first cluster of nodes;
receiving a second image manifest having metadata for the second image file from the second cluster of nodes; and
combine the first image manifest and the second image manifest into a manifest list.

13. The method of claim 12, wherein:
the build request is a request to build a container image from source code for the software, the container image being configured for launching a container within a host environment;
first image file is a first container image that is compatible with the first computer architecture; and
the second image file is a second container image that is compatible with the second computer architecture.

14. The method of claim 12, wherein the first image manifest includes a first indicator of the first computer architecture and the second image manifest includes a second indicator of the second computer architecture.

15. A non-transitory computer readable medium comprising program code executable by a processing device for causing the processing device to:
receive a build request from a client device to build software; and
in response to receiving the build request:
transmit a first request to a first cluster of nodes to cause the first cluster of nodes to build a first version of the software that is compatible with a first computer architecture, wherein at least one node in the first cluster of nodes has the first computer architecture; and
transmit a second request to a second cluster of nodes to cause the second cluster of nodes to build a second version of the software that is compatible with a second computer architecture that is different from the first computer architecture, wherein at least one node in the second cluster of nodes has the second computer architecture.

16. The non-transitory computer readable medium of claim 15, wherein:
the first version of the software is unable to execute on the second computer architecture; and
the second version of the software is unable to execute on the first computer architecture.

17. The non-transitory computer readable medium of claim 15, wherein the first computer architecture is a 64-bit version of an ×86 architecture, a 64-bit version of a PowerPC architecture, or a 32-bit version of the PowerPC architecture.

18. The non-transitory computer readable medium of claim 15, further comprising program code that is executable by the processing device for causing the processing device to determine that the first request is to be transmitted to the first cluster of nodes and the second request is to be transmitted to the second cluster of nodes by (i) extracting information, from a configuration file, indicating on which computer architectures the software is to be built, or (ii) receiving a selection of the first computer architecture and the second computer architecture from the client device.

19. The non-transitory computer readable medium of claim 15, wherein the first version of the software is a first image file that is configured for the first computer architecture, and the second version of the software is a second image file that is configured for the second computer architecture.

20. The non-transitory computer readable medium of claim 19, wherein:
the build request is a request to build a container image for the software, the container image being configured for launching a container within a host environment;
first image file is a first container image that is executable on the first computer architecture; and
the second image file is a second container image that is executable on the second computer architecture.

* * * * *